Jan. 27, 1959
E. L. GRUBBS
2,870,918
ADJUSTABLE CURTAIN, BLIND AND DRAPE HOLDER
Filed May 31, 1956
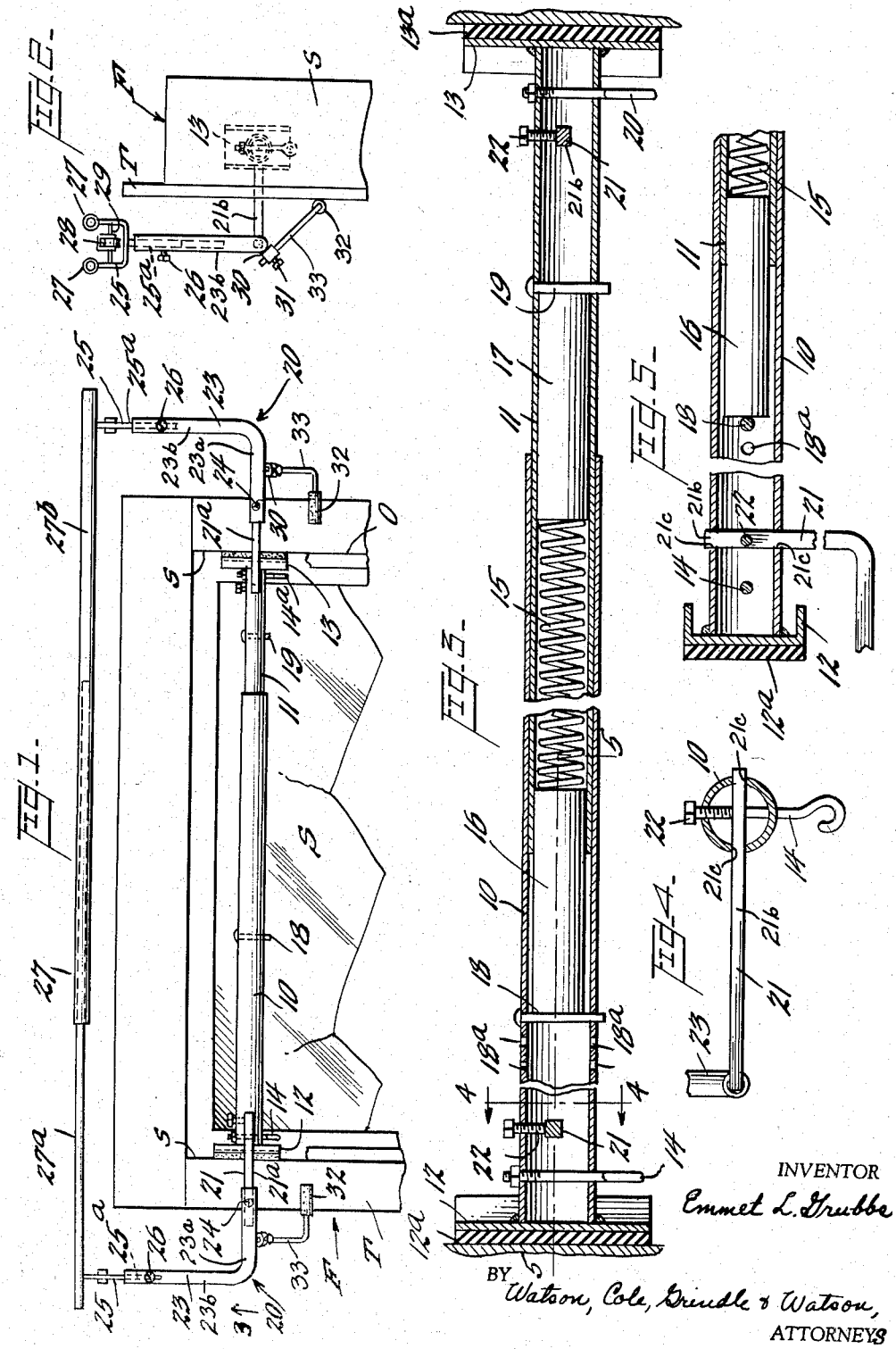
INVENTOR
Emmet L. Grubbs
BY Watson, Cole, Grindle & Watson,
ATTORNEYS

United States Patent Office 2,870,918
Patented Jan. 27, 1959

2,870,918

ADJUSTABLE CURTAIN, BLIND AND DRAPE HOLDER

Emmett Leroy Grubbs, Michigan City, Ind.

Application May 31, 1956, Serial No. 588,539

1 Claim. (Cl. 211—105.2)

This invention relates to a frictionally self-sustaining support for use in window openings for operatively positioning curtains, draperies and the like, exteriorly of the opening, as well as for supporting roller shades, blinds, or other elements within the opening.

It is of importance and therefore an object of the invention to provide such a support, which is capable of being operatively positioned and secured within the window opening solely by frictional engagement with the sides of the window frame or other means defining the opening, and which, therefore, may be mounted without marring the window frame, as is necessitated in structures employing positive securing means, such as screws.

The main supporting element of the invention comprises a resiliently extensible support or rod terminating at its opposite ends in frictional feet or abutments for frictional engagement with the opposite sides of the window frame or opening.

Since such a rod or support is necessarily mounted within the window opening, certain problems arise in connection with the use of such a support for suspending curtains or draperies, or the like, in a plane outside of or in front of the window opening in conventional manner. The main difficulty arises from the fact that draperies in particular may have substantial weight. When thus supported in relatively spaced relation from the major axis of the rod, their weight will be transmitted to the rod with a very substantial leverage to exert a substantial torsional force on the rod tending to angularly displace the rod and its supporting feet about the major axis of the rod.

The present invention has been conceived and perfected with the foregoing in mind and has as one of its major objects to provide a support structure which is capable of withstanding such torsional stresses, while retaining the advantages inherent in such a frictional mounting.

To this end the rod is provided with braces rigidly connected thereto. These braces extend outwardly transversely to the major axis of the rod and have abutment portions disposed laterally beyond the supporting feet at the ends of the rod for abutting engagement with the inner surface of the building wall or with the marginal trim around the frame overlying such surface.

It is a further object of the invention to provide such a support, including brackets for operatively suspending the draperies, curtains or the like, these brackets being adjustable three-dimensionally to adapt the invention for use with window frames having trim of various widths therearound and also for positioning at varying heights within the window frames.

In accordance with one advantageous feature of the invention, the braces for preventing angular displacement of the support are connected to the extensible rod through the said brackets and themselves are adjustable relative to the brackets whereby they may be made to properly cooperate with the wall surface or the trim around the window opening in any of various positions of adjustment of the brackets toward or away from the wall surface.

It is a further object to provide for a novel construction of the resiliently extensible supporting rod, including adjustable means permitting variable ranges of extensibility of the rod, to adapt it for use with window openings varying appreciably in width.

A further important feature of the invention consists in utilizing laterally extensible curtain and/or drapery rods supported by the laterally extensible brackets aforementioned, whereby the rods may be automatically laterally adjusted or extended with the said brackets.

The foregoing and other features and advantages will be readily apparent from the following detailed description, in conjunction with the accompanying drawings, in which:

Figure 1 represents a front elevation of the preferred embodiment of the invention, as applied to a window frame, the window frame being shown in part only;

Figure 2, an end elevation of the structure shown in Figure 1;

Figure 3, an enlarged cross-section on the line 3—3 of Figure 1;

Figure 4, a detail sectional view on the line 4—4 of Figure 3, showing the manner in which the supporting brackets in the preferred embodiment are associated with the extensible rod structure; and Figure 5, a detailed cross-section on the line 5—5 of Figure 3.

Referring now in detail to the accompanying drawings: the invention is shown therein as applied to a window opening O which is defined by a usual rectangular window frame shown in part only and designated in its entirety by the reference character F. This frame includes the usual laterally opposed sides S constituting the sides of the opening O and also preferably includes the usual marginal trim T adapted to overlie the inner surface of the wall in which the window opening O is formed.

The support of the invention as applied to such a window opening O comprises an extensible rod or element which in the present embodiment consists of relatively telescoping tubular members 10 and 11, respectively, provided at their relatively remote ends with gripping feet 12 and 13 adapted to be spread apart by the elements 10 and 11 into frictional gripping engagement with the opposed sides S, respectively, of the window frame. These feet or abutments 12 and 13 are preferably of identical construction and in the preferred embodiment will comprise channel iron sections welded or otherwise fixedly secured on the ends of their respective tubular members 10 and 11. Also, for the purpose of improving the frictional engagement between such feet and the center frame sides S, as well as for providing cushions to prevent marring of the finish of such sides, it is desirable to secure rubber pads 12a and 13a, respectively, over the outer operative faces of these feet for frictional engagement with the sides S.

For the purpose of resiliently extending the said members 10 and 11 along their major linear axis, there may be provided within the member 11 a coil spring 15 compressed between wooden plugs or abutments 16 and 17, respectively, fixed within the members 10 and 11. These abutments may be secured in position within their respective members by means of pins 18 and 19, disposed diametrically through the members 10 and 11 and across the end portions of the abutments 16, 17 in movement limiting relation thereto.

If desired, one of the abutments 16 may be linearly adjustable within its associated member to vary the compression on the spring 15 and thereby adapt the entire structure 10, 11 for use with windows or window openings of widely varying widths or ranges of width. Such adjustability may be attained in various ways, though in the instant embodiment, it is attained by providing a series of relatively linearly spaced openings 18a through the rod 10 adapted for selective reception of the pin 18.

The structure thus far described is well adapted for use in supporting a usual roller shade within the window opening, and for this purpose the rod structure defined by the members 10 and 11 may carry the holders 14 and 14a, respectively, for supporting the conventional spring-wound roller of a window shade within the window opening. As shown in Figure 4, one of these holders 14 may take the form of an eye bolt, the threaded stem of which is passed diametrically through its associated tubular member 10 and positioned against displacement by a nut in usual manner. The eye of this holder 14 is adapted to rotatably receive and support the fixed stem or stub shaft of the shade roller. The other holder 14a may be similarly constructed and associated with its respective tubular member 11, but in place of a generally round or journal forming eyelet, may be formed with a slotted or non-circular eyelet (not shown) adapted to non-rotatably receive and support the usual spring-wound flat driving shaft of the shade roller.

It will be seen that in the structure above described, considered from a broad standpoint, the telescopic tubular members 10 and 11 merely exemplify one of several possible means of extensibly interconnecting the supporting feet 12 and 13 and urging them into frictional supporting engagement with the window frame sides S.

For the purpose of suspending draperies, curtains and the like, from a location outside of and above the window opening O, the extensible rod or support constituted by the members 10 and 11 carries similarly but oppositely disposed brackets, each generally designated 20, extending inwardly from the window opening and projecting somewhat above the opening O whereby to support the draperies and/or curtains from above said opening, as above mentioned.

Each of these brackets 20 will preferably comprise several relatively adjustable parts or components which are preferably capable of three-dimensional adjustments to adapt them for use with different sizes of window openings and different widths of trim T.

Accordingly, in the illustrated exemplification of the invention, each such bracket 20 comprises a generally L-shaped supporting member 21 disposed in a horizontal plane and having one of its arms 21b projecting inwardly at right angles to the plane of the window opening and to the major axis of the tubular sections 10 and 11 for adjustment inwardly or outwardly relative to the window opening, through diametrically opposed openings 21c in the respective sections 10 and 11. This may best be seen by reference to Figures 3, 4 and 5 of the drawings. For the purpose of preventing rotation of the members 21 in their respective openings in tubular members 10 and 11, the members 21 are preferably formed of square or other non-circular cross-section and the openings conform thereto. Adjustment of the supporting members 21 through the members 10 and 11 is maintained by means of set screws 22 threaded through the members 10 and 11, respectively, as shown in Figures 3 and 4. Each of the members 21 also includes an arm 21a, offset outwardly from and extending generally parallel to the major axis of the rod defined by tubular members 10 and 11. A further L-shaped member 23 of tubular construction is carried by the arm 21a of each said member 21 for lateral adjustment thereon. Thus, each such tubular member 23 has a horizontal arm 23a telescopically receiving its associated arm or portion 21a for lateral adjustment thereon such lateral adjustment being maintained by means of the set screw 24 associated with each member 23.

The vertical arm 23b of each such member 23 vertically adjustably receives the depending supporting stem 25a of a bifurcated yoke element or yoke 25, and a set screw 26 threaded through each such element 23 into engagement with said stem 25a is adapted to maintain its associated yoke 25 in any of various positions of vertical adjustment.

Laterally extensible rods 27 which may conveniently comprise relatively telescopically assioated sections 27a and 27b are carried by the respective furcations of the yokes 25 above the window frame F and the opening O defined thereby so that window draperies and/or curtains may be suspended from these rods 27, or either of them, in accordance with conventional practice. With such a structure it may be advantageous in many instances to support a pulley 28 on a shaft 29 extending between the respective furcations of each yoke 25 whereby the control cords for the draperies may be passed around and suspended from such pulleys in conventional manner. It will be apparent from the foregoing portion of the description that the brackets 20 may be adjusted inwardly or outwardly relative to the wall surface and/or the trim T surrounding the window opening and that the yokes 25 may be adjusted vertically, as desired, to properly position the rods 27 above such opening. In addition, the telescoping relation of the support arms 21a and the horizontal arms of their associated tubular members 23 will permit lateral adjustment of the members 23 and yokes 25, as may be desired, to accommodate different types and arrangements of draperies and to properly position such draperies for various widths of trim T around the window. By virtue of the lateral extensibility of the rods 27, it will be seen that such rods will automatically be laterally adjusted with the members 23, thereby automatically accommodating themselves to adjustment of the latter members and in general facilitating such adjustment without interference.

It will be noted that the rods 27 are positioned to support their respective curtains or draperies from locations which are generally quite substantially displaced from the major axis of the telescoping supporting rod defined by the sections 10 and 11. This displacement is necessitated by virtue of the fact that the sections 10 and 11 are located within the window opening, while the curtain and drapery supporting rods 27 are required to be located above such opening and laterally outwardly offset from the plane thereof. The result of this is that the sometimes very appreciable combined weight of the draperies and curtains acts through the brackets 20 to exert a very substantial leverage tending to rotate the rod structure 10 and 11 about its major axis and thereby to angularly displace the gripping feet 12 and 13 about their areas of engagement with the window frame sides S. While the frictional engagement between these feet and the window frame sides is adequate to prevent bodily displacement of the feet relative to the sides, it may not at all times be relied upon to withstand such torsional or twisting forces, particularly when the latter are transmitted with an appreciable mechanical advantage, as in the construction above referred to.

Therefore, in order to enable the frictionally positioned rod structure 10 and 11 to better withstand such forces there are provided braces 33 which are rigidly connected with the rod structure 10 and 11, in the present instance, through the brackets 20. These braces respectively have free end portions or abutments 32 displaced transversely from the major axis of the rod sections 10 and 11 to function as supporting feet for abutting engagement with the window trim T around the window opening O. Each such brace 33, as shown in the accompanying drawings, may comprise an angularly bent rigid member having a vertically inclined or diagonal arm adjustable through a sleeve 30 fixed on the member 23 of its associated bracket 20. A set screw 31 threaded through each such sleeve 30 provides means for holding the member 33 in various positions of adjustment, whereby it may be adapted to accurately support and position the bracket 20 and its associated support rod 10, 11 in various positions of adjustment of the bracket section 23 toward or away from the window trim T. Preferably the abutments 32 will comprise tubular rubber sleeves slidably disposed over the horizontal laterally projecting arms of the braces 33, these cushions 32 extending laterally over the trim T for abutting engagement therewith and being adapted to avoid disfigurement of such trim, while the frictional character of the rubber elements 32 will assist in preventing downward displacement thereof on the trim T.

It should be readily apparent from the foregoing that the device of the invention is adapted for ready application to window openings of varying sizes without danger of marring the window frames; that by virtue of its novel construction and arrangement, it may provide a firm support for relatively heavy draperies and the like, despite the fact that it is positioned solely by frictional engagement with the window frame; and that it will be readily adjustable to meet all requirements for use with various types of window frames and various types of draperies and curtains.

Although in this application I have shown and described only the preferred exemplification of the invention simply by way of illustrating the preferred mode of carrying out the invention, it will be readily apparent that the invention is capable of other embodiments and that its several details may be modified in various ways, all without departing from the inventive concept herein exemplified. Accordingly, the drawings and description herein are to be considered as merely illustrative and not as restrictive.

This is a continuation-in-part of my application Serial No. 336,849, filed February 13, 1953, now abandoned.

Having thus described the invention, I claim:

A frictionally self-sustaining support for application within a window opening to support articles in spaced relation from the plane of said opening, comprising a pair of relatively spaced, oppositely laterally presented gripping feet, means connected between said feet for spreading same laterally apart for gripping engagement with the opposite sides of a window opening, and braces rigidly connected to said support and carrying supporting feet on the relatively remote sides of said gripping feet and out of alignment therewith, in combination with article supporting brackets carried by said support for adjustment horizontally relative to a vertical plane through said feet, said braces being carried by said brackets and extending diagonally below said means connected between the feet and toward said vertical plane for abutting engagement with a supporting surface at one side of the window opening, and means associated with the respective braces for adjusting same diagonally toward and away from said plane.

References Cited in the file of this patent
UNITED STATES PATENTS

| | | |
|---|---|---|
| 645,543 | Birch | Mar. 20, 1900 |
| 647,755 | Menzel | Apr. 17, 1900 |
| 939,808 | Cook | Nov. 9, 1909 |
| 956,432 | Schoepe | Apr. 26, 1910 |
| 1,069,302 | Thurston | Aug. 5, 1913 |
| 1,337,827 | Dodson | Apr. 20, 1920 |
| 1,606,986 | Clark | Nov. 16, 1926 |
| 1,732,950 | Robinson | Oct. 22, 1929 |
| 1,749,863 | Wehner | Mar. 11, 1930 |
| 1,814,066 | Wendel | July 14, 1931 |
| 1,868,439 | Zielinski | July 19, 1932 |
| 2,474,434 | Mentz | June 28, 1949 |
| 2,509,521 | Pegram | May 30, 1950 |